Figure 1:
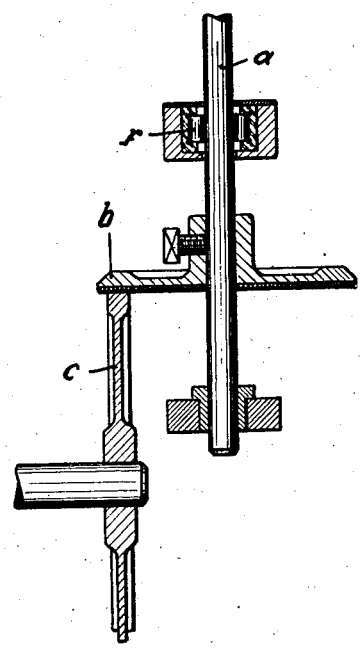

Sept. 20, 1927.

J. KIRNER 1,642,815

MEANS FOR DRIVING SPINDLES

Filed May 10, 1924

Inventor:
Josef Kirner
by
Attorney.

Patented Sept. 20, 1927.

UNITED STATES PATENT OFFICE

1,642,815

JOSEF KIRNER, OF STUTTGART, GERMANY.

MEANS FOR DRIVING SPINDLES.

Application filed May 10, 1924, Serial No. 712,404, and in Germany August 20, 1923.

My invention refers to means for driving spindles or other vertical shafts and more particularly to a friction drive for such spindles, quite especially spinning spindles and the like. It is an object of my invention to improve the operation of such spindles.

Amongst the different means for driving spindles, the friction gear drive is distinguished as being easily thrown in and out by merely lifting and lowering the spindle respectively. On the other hand, a spindle driven by means of friction wheels is likely to execute undesirable vertical movements, usually called hopping movements. It is of course possible to prevent such movements from arising by preventing the spindle from moving axially, but in that case the possibility is lost of easily throwing the friction drive in and out.

According to the present invention now, the spindle is effectually prevented from hopping, while being still enabled to move in vertical direction, so that it can easily be thrown in and out.

In order to fully explain my invention and how the same is to be performed, I have illustrated in the drawings annexed to this specification by way of example the new spindle arrangement according to the present invention.

In the drawings

Figure 2:
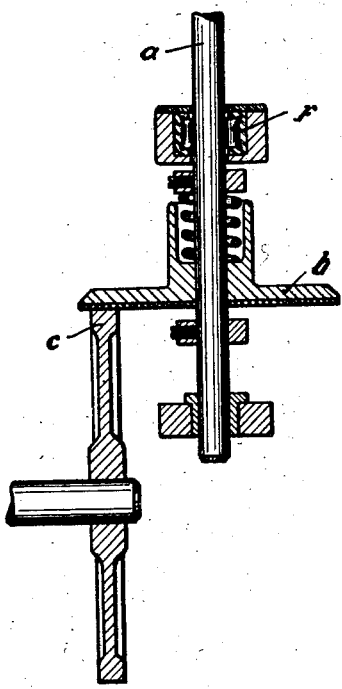

Figs. 1 and 2 are axial sections of two forms of friction drives embodying my invention by way of example.

Referring first to Fig. 1, the shaft $a$ of the spindle is entirely smooth and has the friction disc $b$ rigidly connected with it, $r$ is a roller bearing surrounding shaft $a$. Experiments have shown that a spindle surrounded by a roller bearing cannot be displaced in axial direction as easily as in the case of a simple journal bearing. For, while in the circumferential movement of the spindle only the very low roller friction must be overcome, every attempt to quickly displace the spindle in axial direction will first cause the rollers to tilt somewhat, and this tilting of the rollers renders a quick displacing of the spindle in axial direction difficult and acts towards damping any attempts of the spindle to hop in axial direction. Therefore axial shocks of short duration, such as will be caused by lateral oscillation or wearing down of the driving wheel, will merely cause an elastic change of form of the soft material covering the friction disc. On the other hand, the spindle can still be thrown out or stopped by lifting disc $b$ off the wheel $c$ driving it, because this stopping movement is carried out comparatively slowly.

Instead of providing the friction disc with an elastic covering, it may also be acted upon by a spring (as shown for instance in Fig. 2), this being particularly recommendable in cases where the wheels are likely to oscillate or to wear down so as to get oval. In this case the expansion of the spring is limited in such manner that the spindle can still be thrown out by lifting it.

I wish it to be understood that I do not desire to be limited to the exact details of construction shown and described, for obvious modifications will occur to a person skilled in the art.

I claim:—

1. Means for driving spindles, comprising a substantially vertical spindle arranged for free axial displacement, a driving wheel near said spindle, a friction wheel on said spindle and resting on said driving wheel so as to support the spindle, a roller bearing surrounding and in contact with said spindle, and means for preventing longitudinal displacement of the rollers thereof.

2. Means for driving spindles, comprising a substantially vertical spindle arranged for free axial displacement, a driving wheel near said spindle, a friction wheel on said spindle and resting on said driving wheel so as to support the spindle, a spring adapted to act on said friction wheel so as to press it against said driving wheel and a roller bearing including means for restraining the rollers against longitudinal movement surrounding and in contact with said spindle.

3. Means for driving spindles comprising a substantially vertical spindle arranged for free axial displacement, a driving wheel near said spindle, a friction wheel on said spindle and resting on said driving wheel so as to support the spindle, a spring adapted to act on said friction wheel so as to press it against said driving wheel, a roller bearing surrounding and in contact with said spindle and an abutment for the upper end of said spring on said spindle.

In testimony whereof I affix my signature.

JOSEF KIRNER.